United States Patent

[11] 3,594,086

[72] Inventors Leonard A. Hughes
1526 Mountain Blvd., Oakland, Calif. 94611;
Willard Tressel, 667 Cragmont Avenue, Berkeley, Calif. 94708; Evan R. Flavell, 3200 Shattuck Avenue, Berkeley, Calif. 94705
[21] Appl. No. 764,190
[22] Filed Oct. 1, 1968
[45] Patented July 20, 1971

[54] COLORIMETER USING INTERCHANGEABLE METER FACE MEMBERS
4 Claims, 10 Drawing Figs.
[52] U.S. Cl. ................................................ 356/186, 324/115
[51] Int. Cl. ................................................ G01j 3/48
[50] Field of Search ...................................... 356/39, 186; 324/115

[56] References Cited
UNITED STATES PATENTS
| | | | |
|---|---|---|---|
| 2,466,558 | 4/1949 | Sadlon ........................... | 324/115 |
| 2,550,936 | 5/1951 | Poirette ......................... | 324/115 UX |
| 2,836,793 | 5/1958 | Kelly ............................. | 324/115 |
| 2,891,438 | 6/1959 | Fuhrmann et al. ............. | 324/115 X |
| 3,278,739 | 10/1966 | Royka et al. ................... | 350/96 X |
| 3,311,825 | 3/1967 | Waters ........................... | 324/115 |
| 3,392,623 | 7/1968 | Walker et al. ................. | 356/205 |
| 3,441,352 | 4/1969 | Hughes .......................... | 356/39 X |

FOREIGN PATENTS
| | | | |
|---|---|---|---|
| 764,623 | 5/1934 | France .......................... | 324/114 |

Primary Examiner—Ronald L. Wibert
Assistant Examiner—Warren A. Sklar
Attorneys—Joseph C. Schwalbach, Michael A. Kondzella, Louis E. Davidson and Harry T. Stephenson ABSTRACT: A colorimeter which, as one unit of instrumentation, quantitatively analyzes individual test samples of biologic materials for medical purposes according to any one of a presently substantial and prospectively expandable number of different qualitative assays. The instrumentation features a single unscaled meter with an indicator, a set of interchangeable dials that provide both scales for different assays to the meter and switch actuators for automatic selection of photocells for different assays, a constant temperature environment for the photocells, and light distribution by fiber optics. The meter and its indicator are calibrated to a midscale value representing a physiologically significant value of an assayed material. The unit also has a timer and constant temperature wells for preparation of test samples.

INVENTORS
Leonard A. Hughes
Willard Tressel
Evan Flavell
BY Walter C. Ramm
ATTORNEY

COLORIMETER USING INTERCHANGEABLE METER FACE MEMBERS

This invention concerns colormetry apparatus for individual quantitative analysis of biologic materials, such as human blood, according to any selected one of a number of different specific qualitative assays. Analysis is performed upon an individual test sample which is contained in an essentially transparent vessel and presented to the apparatus. Typically, the test sample comprises a small amount of test material which has been obtained from a patient, combined with reagents for the specific assay, and prepared to develop a color reaction. The immediate purpose of each analysis is to measure the amount of the assayed substance in the test material, for example, the grams percent of hemoglobin in a patient's blood. Measurements of this kind are useful in medical examination and diagnosis; in medical parlance they are often called "blood chemistries."

This invention subserves several objects. One object is to have a single unit of instrumentation possessing present capability economically to perform any of a large number of different specific assays. A second object is to provide such a single unit which enables quantitative measurements with enhanced accuracy and reliability, these attributes being of high consequence in medical practice. A third object is to afford such a single unit which is physically compact and operationally simple so that it may be utilized in the physician's office or the hospital laboratory, thereby saving the time and obviating other disadvantages that may attend the transport of test material to and the reporting of test results from an outside laboratory. A fourth object is to enable such instrumentation readily and inexpensively to be adapted to perform additional specific assays, beyond its present range, when and as additional assays are devised.

The preferred embodiment of this invention is described in this specification and illustrated in the accompanying drawings

FIG. 4 represents a sectional view of the analyzer instrument taken on line 4—4 of FIG. 1 showing a dial member emplaced and certain elements of the instrument;

Persons skilled in the art will notice, in the section of this specification entitled "General Description and Organization," that the apparatus of this invention involves the well-known principle of colorimetry, that is, a determination of compositional characteristics of a test sample based on the light transmissivity of the test sample as measured by means of an electrophotometric sensor such as a photocell. However, this invention is distinguished by special, novel and improved features of structure and operation which contribute importantly to its particular capabilities and usefulness, and enable its stated objects to be accomplished. These features are detailed in this specification, both in the "General Description and Organization " and in additional sections entitled "Automatic Wave Band Selection," "Mid-Scale Calibrations," "Optimized Light Source," "Constant Temperature Environment," and "Timing Means."

General Description and Organization

Figure 1:
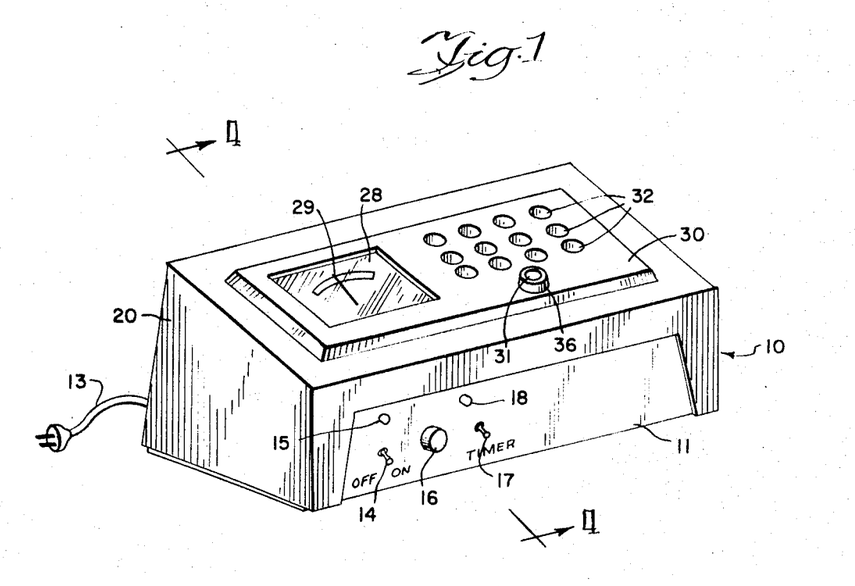
FIG. 1 is a perspective view of the analyzer instrument.
Figure 2:
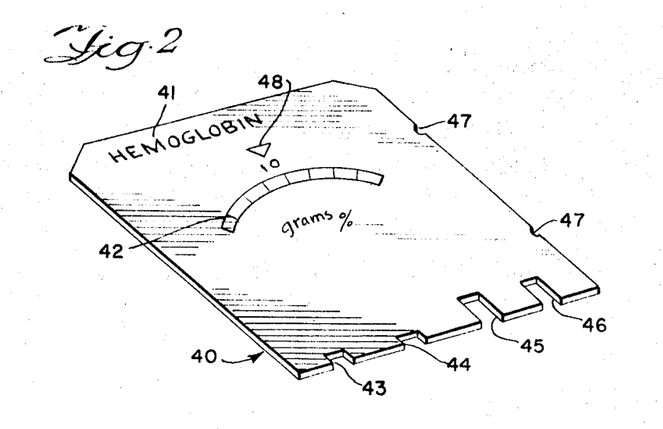
FIG. 2 is a perspective view of a typical dial member.

FIG. 1 shows analyzer instrument 10 and its principal structural components —base 11, housing 20 and face plate 30. FIG. 2 represents a typical dial member 40.

Figure 6:
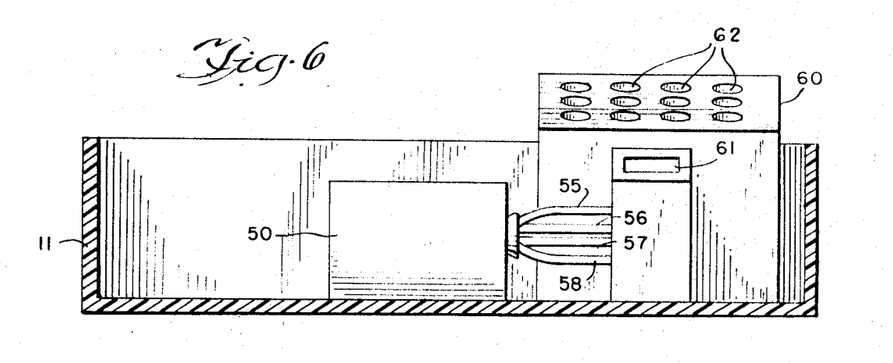
FIG. 6 represents a sectional view of the analyzer instrument's base taken on line 6—6 of FIG. 5, showing certain elements of the instrument.
Figures 7, 9:
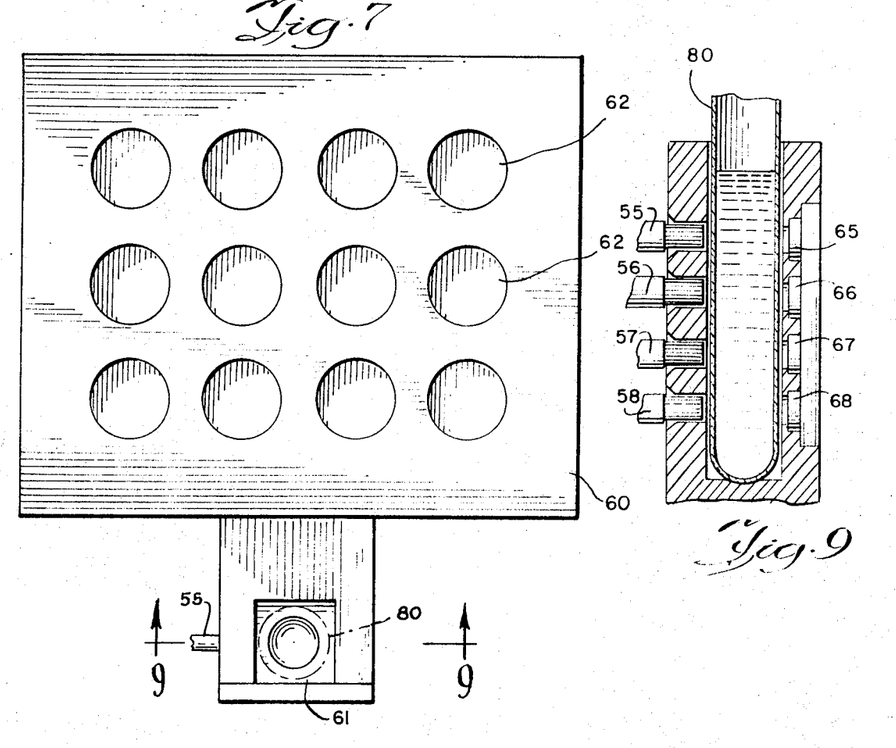
FIG. 7 is a plan view of the analyzer instrument's incubator block-testwell assembly.
FIG. 9 includes a front elevation of the testwell at section 9—9 of FIG. 7, with a cuvette in the testwell.
Figure 8:
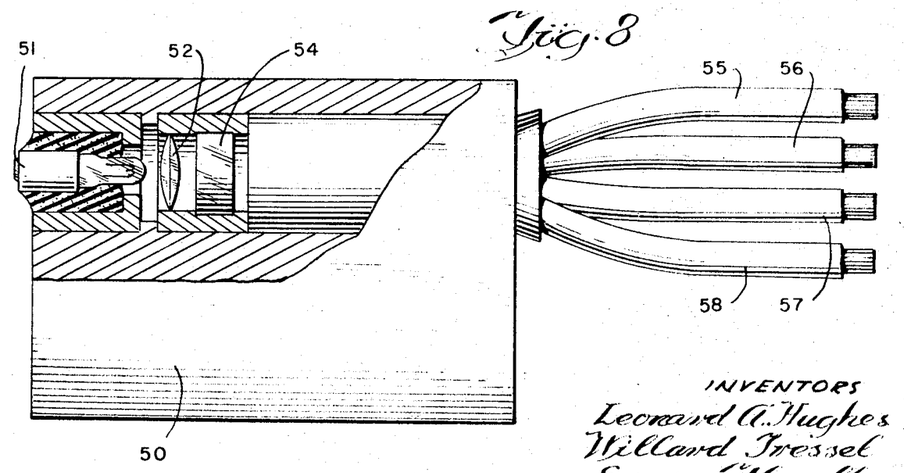
FIG. 8 is a detailed view of the analyzer instrument's light source assembly with the housing thereof in part removed.

Base 11 carries light source 50, circuit boards 12, speaker 19 and incubator-testwell assembly 60; FIG. 6 shows these elements and their arrangement. Base 11 also provides power connection 13, power switch 14, power pilot lamp 15, calibration knob 16, timer switch 17 and timer warning lamp 18, as shown in FIG. 1. Light source 50 includes lamp 51, and fiber optic elements 55, 56, 57 and 58, as shown in FIG. 8. Incubator-testwell assembly 60 provides testwell 61 and carries, in opposed walls of and communicating to testwell 61, the respective distal ends of each of the four fiber optic elements 55, 56, 57 and 58 and four photocells 65, 66, 67 and 68, each photocell being registered with an end of one of the fiber optic elements, as shown in FIG. 9. Respectively, as so carried, the distal ends of the fiber optic elements and the photocells are vertically spaced. Thus, there are provided, across testwell 61, four light paths, each running via one of the fiber optic elements to the opposed photocell. Incubator-testwell assembly 60 also provides a number of incubator wells 62, as shown in FIG. 7.

Figure 5:
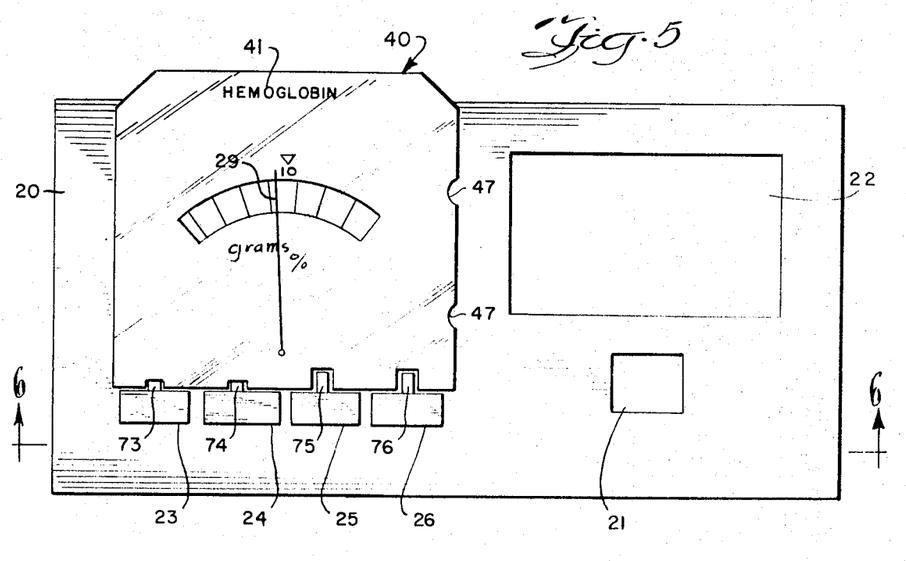
FIG. 5 is a plan view of the analyzer instrument, but with its face plate removed and a dial member illustrated in the emplaced position.

Housing 20 carries four switches 23, 24, 25 and 26, and unscaled meter 27 having indicator 29 beneath flat, transparent cover 28 therefor. FIG. 4 shows meter 27 on housing 20. FIG. 5 shows the switches, mounted in an aligned relationship to each other. The switches, respectively, have actuators 73, 74, 75 and 76, with which they are opened and closed, and, depending upon the combination in which the switches are opened and closed, they are arranged with suitable connections and circuit components to include in a power circuit with light source 50 and meter 27 one of the four photocells, all as represented in the circuit diagram of FIG. 10. Housing 20 also has rectangular openings 21 and 22 which allow communication, respectively, to testwell 61 and incubator wells 62.

Figure 3:
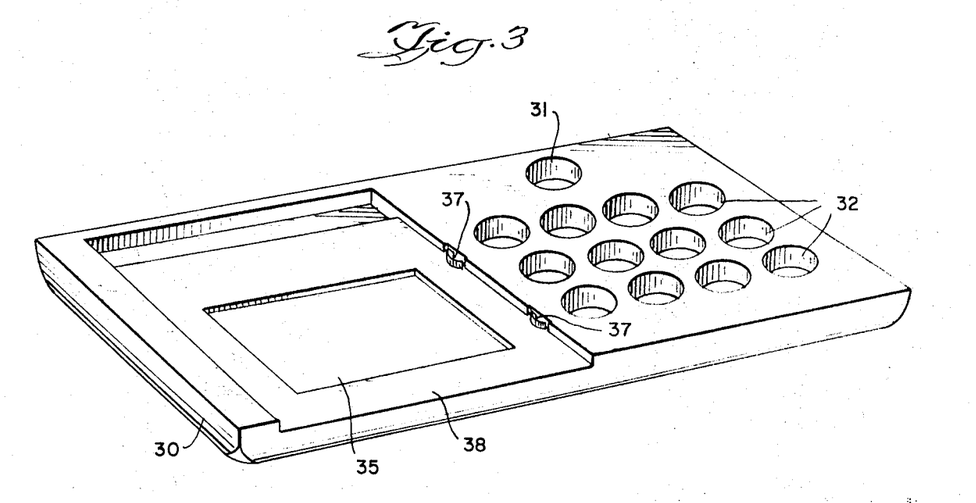
FIG. 3 is a perspective view of the under side of the analyzer instrument's face plate.

Face plate 30 has a cutout window 35; an opening 31 communicating to testwell 61 which opening 31 is surrounded by a collar 36; a number of openings 32 communicating respectively to incubator wells 62 in incubator-testwell assembly 60; and a generally rectangular recess 38 in its underside, all as shown in FIG. 3. Adjacent recess 38, on the underside of face plate 30, are two spaced springs 37. Face plate 30 is secured atop housing 20 by any convenient conventional means; when it is, as shown in FIG. 1, indicator 29 is seen through window 35. Likewise, housing 20 is secured to base 11 by conventional means.

Typically, this invention includes a separate, individual dial member 40 for each specific assay. Each dial member 40 includes a name 41 to identify its assay, a scale 42 for the assay, and two spaced indentations 47 in a side marginal portion. The dial members for a particular analyzer instrument comprise a set. In the described embodiment all dial members in a set have the same overall dimensions and generally rectangular shape; they are structurally discrete and physically interchangeable; each dial member appears as a rigid, transparent plate that is slightly less wide than the width and less thick than the depth of recess 38. In other embodiments, these members could take different forms and arrangements such as, for example, as flexible interconnected respective web portions of a continuous belt or roll.

As suggested in FIG. 4, when face plate 30 is secured atop housing 20, there is formed a slot —defined be recess 38, cover 28 and the sides of aligned switches 23, 24, 25 and 26 — in which a dial member 40 may be inserted and emplaced. So emplaced, as illustrated in FIG. 5, dial member 40 is superposed above meter 27 and scale 42 is registered and readably associated with indicator 29. Springs 37, engaging inserted dial member 40 by its indentations 47, constrain it in emplaced position and also enable its withdrawal from the slot.

This apparatus possesses present capability to perform twelve different specific assays of human blood relating to ten different blood components. These assays and the named methods by which respective test samples therefor are prepared to develop and exhibit characteristic color reactions are recited in Table I.

TABLE I

| Assay | Named Method of Preparation |
| --- | --- |
| Hemoglobin (a) | oxy method |
| Hemoglobin (b) | cyan method using Drabkin's solution |
| Glucose (a) | glucose oxidase-peroxidase enzymatic method, with color developed with sulfamic acid |
| Glucose (b) | ortho toluidine-glacial acetic acid method |
| Uric Acid | phosphotungstate-carbonate method |
| Cholesterol | Lieberman-Bunchard method |
| Blood Urea Nitrogen | urease enzymatic method employing Berthelot reaction |
| Bilirubin | modified method of Ven.. ..ik and Grof with caffeine accelerator and conversion to alkaline azobilirubin |
| Total Protein | modified biuret method |
| Albumin | HBABA dye absorption method |
| Phosphatase | modified method of Bessly, Lowry and Brock with stabilized substrate |
| SGOT/SGPT | vanillin/pyruvate reaction of Trinder and Kirkland |

In addition to combining a blood sample with reagents according to the named methods, preparation of an individual test sample often requires incubation under certain time and temperature conditions. Typically, preparation of a test sample is completed in a transparent vessel such as cuvette 80 of FIG. 9.

When a test sample is prepared and exhibits its characteristic color reaction according to the selected specific assay, the operator previously having emplaced the dial member 40 for the assay in the hereinabove described slot between housing 20 and face plate 30 and thereby included the appropriate photocell for the assay in the power circuit with meter 27, and also having calibrated meter 27 (both as hereinafter described), the operator places the test sample in cuvette 80 in testwell 61 between light source 50 and the photocell. The light transmitted through the test sample —that is, the light not absorbed by it — is sensed by the photocell and, through the associated circuitry, causes deflection of indicator 29. The deflection, read by the operator on scale 42 of the emplaced dial member 40 expresses directly the quantitative determination of the assayed substance.

The described general organization of this invention confers these advantages. It requires but a single meter 27 (instrumented specifically to accommodate a plurality of different scales, and not merely a universal scale) in analyzer instrument 10 with which to perform a large number of different assays thus effecting a significant saving of manufacturing cost. Also, it provides the apparatus with prospective as well as present capability, for, as additional specific assays are devised, all that need be added to the instrumentation is a new dial member 40 for each such assay. Any such addition, in view of the dial member's simplicity, would be inexpensive.

Automatic Wave Band Selection

This invention, in its described embodiment, provides four photocells 65, 66, 67 and 68 in incubator-testwell assembly 60. For analyses according to any one selected assay, only one of these photocells is in-circuit with meter 29. Each photocell is adapted to have response to transmitted light within one of four different wave bands, each such wave band being specified in terms of a peak response wave length. The four wave bands and the respective assays performed at each (by means of the photocell for such wave band) are recited in Table II.

TABLE II

| Wave Band (mu) | Assay |
| --- | --- |
| 430 | Glucose (a), Phosphatase, SGOT/SGPT |
| 530 | Hemoglobin (a), Hemoglobin (b), Blood Urea Nitrogen, Total Protein, Albumin |
| 580 | Bilirubin |
| 640 | Glucose (b), Uric Acid, Cholesterol |

The four switches 23, 24, 25 and 26 are the components which directly govern and enable inclusion of a selected photocell in the circuit and, accordingly, wave band selection. When no dial member 40 is emplaced in analyzer instrument 10, the actuators 73, 74, 75 and 76 of the switches are urged to a uniform relatively raised position.

Dial member 40, as FIG. 2 shows, has four spaced notches 43, 44, 45 and 46 along its lower marginal portion. The spacing of these notches corresponds to the spacing of actuators 73, 74, 75 and 76. According to the dimensions and organization of the notches, when a dial member 40 is emplaced, it may be direct contact urge and hold any one or more of the actuators to and in a relatively depressed position, thus shifting the condition of the switch of each contacted and held actuator. An exemplary arrangement appears in FIG. 5; dial member 40 is emplaced and constrained in emplacement (by springs 37); notches 45 and 46, being of larger dimensions, avoid contact between dial member 40 and actuators 75 and 76 which remain in the relatively raised position, while notches 43 and 44, being of small dimensions, contact actuators 73 and 74, thus having urged and holding them in the relatively depressed position. By this arrangement, the selected photocell is switched into the circuit, the three unneeded (for the particular assay) photocells are switched out, and automatic wave band selection is accomplished. The switches may be organized and connected simply and directly to control respective photocells, or in a binary form, or in more complex arrangements also to provide accessory functions, for example, to maintain voltage upon photocells which are not in circuit with the meter in order that such photocells be immediately available (without warming up) when selected.

This disclosed arrangement is an essentially mechanical arrangement with, in effect, spaced notches 43, 44, 45 and 46 providing a simple code of selector elements whereby analyzer instrument is prepared and adjusted for a particular assay. In other embodiments of this invention, a dial member could provide other and perhaps more sophisticated means whereby the particular assay is identified by an analyze.. instrument, such as conductive circuit-completing elements.

This disclosed arrangement for automatic wave band selection confers distinct advantages. It enables a necessary function to be subserved with simple mechanical elements. More importantly, it conserves the operator's time and eliminates sources of possible operator error. The operator, to select the appropriate wave band for a specific assay, has only to read name 41 on dial member 40 and emplace the dial member, and need not perform any other operation for the purpose.

Mid-Scale Calibration

Analyzer instrument 10, for any one analysis or series of contemporaneously-performed analyses according to a specific assay, requires calibration. Calibration is based upon a color standard having known light transmissivity at the specified wave band for the assay. The color standard is contained in a cuvette or similar vessel and, in the same manner as hereinabove described for a test sample, is placed in testwell 61 when the dial member 40 for the assay is emplaced in the analyzer instrument. With the color standard so placed, any by calibration knob 16 and associated circuitry, the operator adjusts indicator 29 to the scale value corresponding to the known transmissivity of the standard.

In other and earlier colorimetric instruments for blood analysis, calibration is based upon a color standard and made to a scale value representing 100 percent light transmittance to light within the wave band for the particular assay. However, this invention provides an improved mode of calibration. Rather than a standard having 100 percent transmittance, this invention is specifically adapted to employ for calibration of the analyzer instrument according to each assay a color standard possessing transmittance properties which correspond to and define a critical physiologic value of the assayed material, that is, a value representing and within a particular range of values that have special clinical significance and import. This critical physiologic value appears in the middle range of a scale 42 and is indicated by a calibration mark 48 on such scale for a particular assay.

Figure 10:
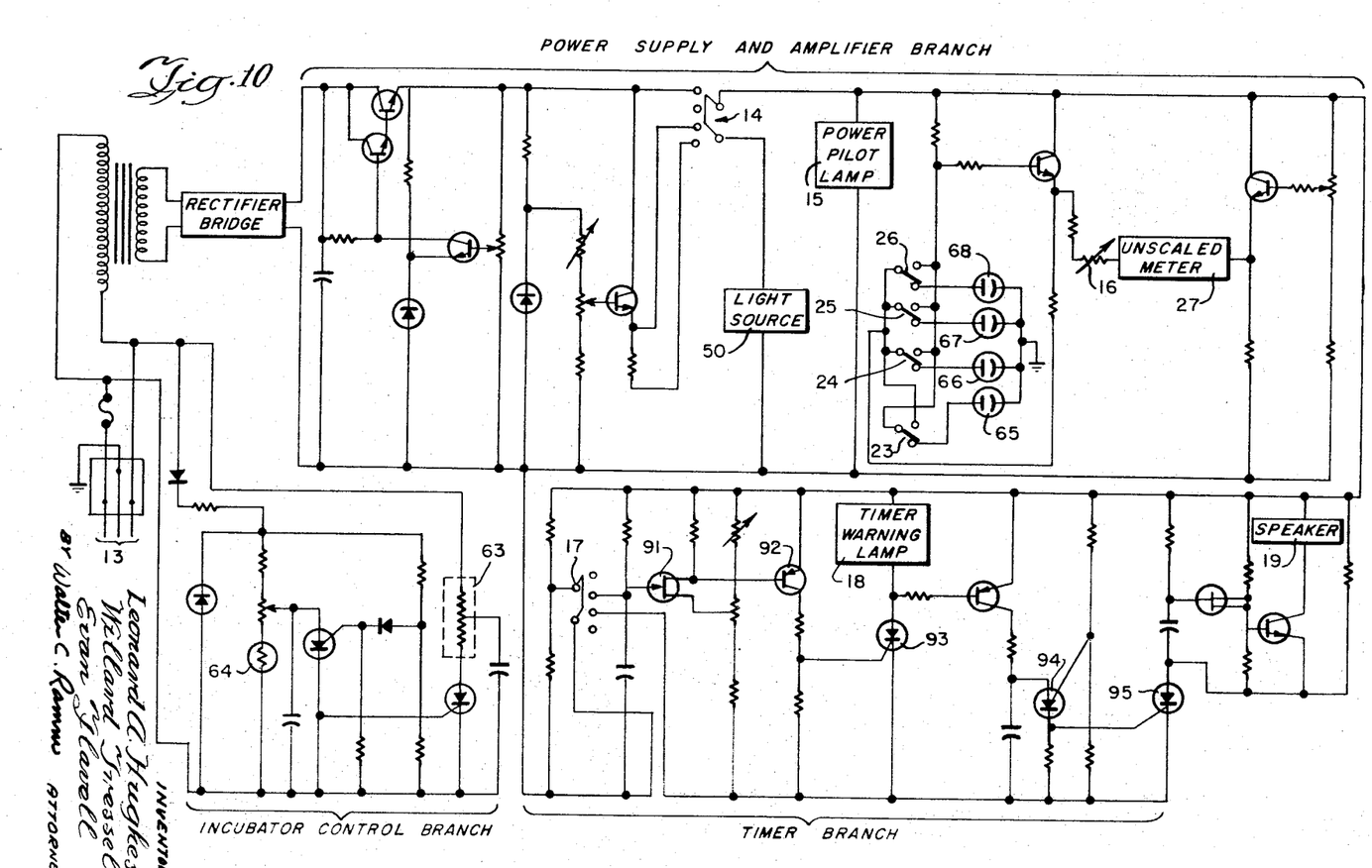
FIG. 10 comprises circuit diagrams for the analyzer instrument.
Figure 11:
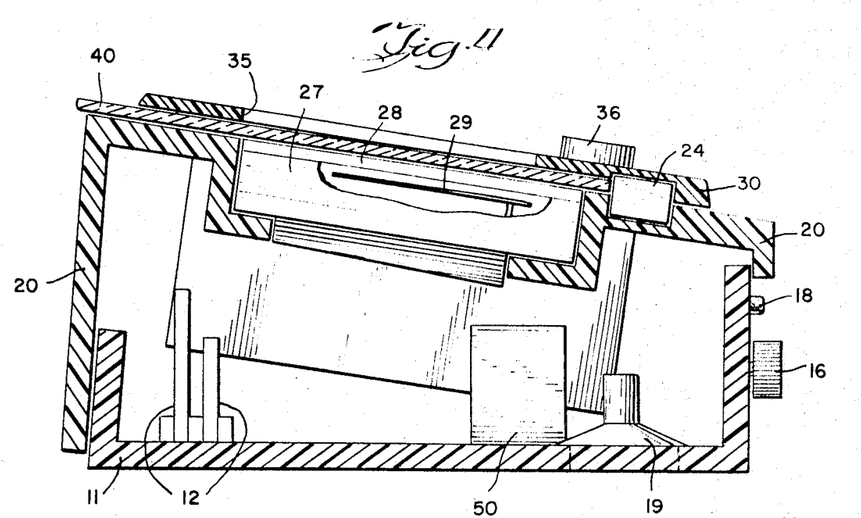

For example, one of the assays performed with this invention is the hemoglobin measurement. Normal hemoglobin concentration in human blood is generally regarded as being in the range of approximately 12—16 grams percent, and for a particular patient an assayed hemoglobin value in such normal range may not be of special clinical significance. However, a deviation from the normal range of hemoglobin values is apt to be of special import when the value thereof is approximately 10 grams percent. Accordingly, the color standard for the hemoglobin assay possesses a transmissivity corresponding to 10 grams percent and, as shown in FIG. 2, dial member 40 provides calibration mark 48 at about 10 grams percent in the middle range of scale 42. When the hemoglobin color standard is in testwell 61, the operator adjusts indicator 29 to calibration mark 48. The associated circuitry, as represented in FIG. 10, is designed to accommodate a wide range of indicator adjustment.

This arrangement for midscale calibration confers advantage in that it contemporaneously performed flexibly matches the capabilities of the analyzer instrument with values that are actually encountered in the clinic instead of with the more arbitrary 100 percent transmittance standard, as heretofore. And with a scale running below and above the normal value, assays may be made with equal facility for the patient having an elevated value of the assayed substance as well as for the patient having a lowered value. Also, the arrangement allows an expanded scale which enhanced the sensitivity, accuracy and readability of the analyzer instrument.

Optimized Light Source

A light source is an essential feature of colorimetry apparatus. However, light source 50 of this invention differs markedly from the lamps, reflectors, slitted apertures and other arrangements that heretofore have been employed. Particularly, by fiber optics, the present arrangement directs and channels light emanations along each of four distinct light paths, respectively, to each of the photocells. More particularly, this arrangement enables transmitted light along each path to be matched optimally with a particular photocell in at least two respects: first, a selected quantum of light is directed along a particular path, and second, the light, as directed to the photocell is uniformly distributed over the cross section of the path.

FIG. 8 shows light source 50 and its several parts — lamp 51, at least one lens 52, infrared filter 54 and four fiber optic elements 55, 56, 57 and 58. Lens 52 focuses light from lamp 51, and filter 54 excludes unneeded manifestations from the light.

Each fiber optic element comprises a selected number individual fibers, is covered by tubing over a substantial portion of its length, and has one separate and distal end portion which, as illustrated in FIGS. 6 and 9, is placed in an opening in a wall of testwell 61. In an exemplary embodiment of this invention, fiber optic elements 56, which has its distal end portion opposed to photocell 66 (which photocell responds to light in the 430 mu wave band), has 64 individual fibers, and the other three fiber optic element each have 32 fibers. Thus, the quantum of transmitted light is made to correspond precisely with the capabilities and requirements of each of the photocells. Likewise, the uniform distribution of light over the cross section of a light path enables a photocell to function optimally and with enhanced efficiency, obviating inaccuracies and spurious results that otherwise could result from a less uniform distribution.

All four fiber optic elements and all of the individual fibers comprising them are joined in a common proximal end portion adjacent filter 54. As so joined and presented to focused filtered light emanating from lamp 51, the ends of all individual fibers are arranged to ensure that each fiber optic element receives and transmits a respectively adequate and representative quantum of the light. This arrangement may be accomplished by randomizing the ends of all individual fibers.

Constant Temperature Environment

This invention involves considerations of temperature in two respects. First, a temperature somewhat higher than ambient conditions is required for incubation of a test sample and development of the test sample's color reaction to a stable, predictable value. Second, temperature variations affect the performance characteristic of a photocell, and therefore of the analyzer instrument, and also, possibly, the color of a developed test sample; accordingly, all analyses are preferably performed under constant and uniform temperature condition. The apparatus of this invention provides a constant temperature environment both for incubation and analysis of test samples.

The constant temperature environment is afforded by incubator-testwell assembly 60 and the incubator control circuit shown in FIG. 10. Incubator-testwell assembly 60, fabricated in the disclosed embodiment of aluminum, is characterized by the capability uniformly to conduct and distribute heat throughout the structure; for example, when, as necessary, heat is supplied to incubator-testwell assembly, the temperature of the walls defining testwell 61 and each incubator well 62 is essentially constant; likewise, each of the four photocells, being carried and, in effect, heat sunk in incubator-testwell assembly 60, operates in the stable condition induced by the same essentially constant temperature. Heat is supplied to incubator-testwell assembly 60 by heater 63 and temperature is controlled by thermistor 64, represented in the circuit diagram of FIG. 10. In the described preferred embodiment, the operating temperature for and of incubator testwell assembly 60 is 37.5° C. ±0.5°C.

Timing Means

The aspect of time may be importantly involved in the optimal utilization of this colorimetry apparatus. The operator may desire to be assured that analyzer instrument 10 is "warmed up" so that a steady-state temperature obtains in incubator-testwell assembly 60 and the photocells operate under a stable temperature condition. Also, the test samples may require incubation for a specified time in incubator wells 62 for the development of color reactions.

To accommodate these requirements, analyzer instrument 10 may be provided with a nonmechanical timing means comprising a timer circuit as disclosed in FIG. 10, including components such as timer switch 17 timer warning lamp 18 and speaker 19. Thus, when switch 17 is closed and power is supplied to the timer circuit the circuit, through transistors 91 and 92, rectifier 93 and other components, commences to develop a current which according to the particular characteristics of such components, during a first time period, reaches and sustains an amperage to light lamp 18. The illumination of lamp 18 signals the operator that the first time period has lapsed. Further, switch 17 remaining closed, a second time period thereupon begins (during which the operator may undertake or complete certain tasks without having to "watch the clock") and continues while the current develops, in the timer circuit and through transistor 94 and rectifier 95, to the amperage needed to activate speaker 19. The sounding of speaker 19 signals completion of the second time period. The operator may open switch 17 whereupon the timer circuit immediately resumes a wholly unpowered condition. In association with a preferred embodiment of this invention, the timing means provides for the first time period to run for approximately 10 minutes and the second time period to run for approximately 2 minutes.

This timing means is of particular advantage in that it may be compactly embodied with analyzer instrument 10, has no mechanical working parts and, as noted, need not be watched by the operator during the second time period.

We claim:

1. Colorimetry apparatus for performing any selected ones of a plurality of different qualitative assays of biologic materials and to provide, according to a selected assay, quantitative date based on the light absorption characteristics of a test sample, containing a biologic material and prepared for such assay, which apparatus comprises in combination a housing;
   a circuit including a power connection and an unscaled meter having an indicator carried on the housing;
   a block carried within the housing and providing a testwell;
   a light source to provide a plurality of paths of light emanation through the block and across the test well, said light source comprising a lamp and a plurality of fiber optics elements, each fiber optic element having a predetermined number of individual fibers depending upon the quantum of light required for a particular assay, the distal end of each element being held in a wall defining the testwell, all of such fiber optic elements joined in a proximal common end which receives light emanation from the lamp,
   a plurality of photocells carried in the wall defining the testwell, each photocell being opposite a corresponding distal end of a fiber optic element and being particularly responsive to light within a respectively different wave band, and arranged to be includable in the circuit;
   at least the selected one of a plurality of dial members, each such dial member providing a scale for different assay, adapted to be emplaced in and removed from readable association with the indicator, and having respectively distinguishing selector means; and
   switch means on the housing responsive to the selector means of the selected dial member to include in the circuit one of the photocells, so that when the selected dial member is emplaced in readable association with the indicator, and power is supplied to the circuit, and a test sample is placed in the testwell across the light path to the in-circuit photocell, the light transmitted to the in-circuit photocell influences the meter, and the indicator is caused to show in the scale, the reading for the test sample.

2. The apparatus of claim 1 where the electric circuit includes also calibration components for adjustment of the indicator and each dial member provides also a calibration mark in the middle range of its scale corresponding to a critical qualitative value of the biologic material according to the selected assay, to which calibration mark the indicator is adjusted preparatory to disposing the test sample in the testwell.

3. The apparatus of claim 1 where the plurality of dial members consists of a set of structurally discrete and physically interchangeable elements, each such element being a rigid, relatively thin and transparent plate and having, as its respectively distinguishing means, a plurality of notches in a marginal portion which are dimensioned to afford a respectively particular mode of contact between the switch means and such element when the element is emplaced in readable association with the indicator.

4. The apparatus of claim 1 where the apparatus includes a heater circuit comprising a heater and temperature control components associated with the block to maintain the block at a substantially uniform temperature when power is supplied to the heater circuit and where the block provides also a plurality of wells for the incubation of test samples.

PO-1050
(5/69)

UNITED STATES PATENT OFFICE
CERTIFICATE OF CORRECTION

Patent No. 3,594,086    Dated July 20, 1971

Inventor(s) Leonard A. Hughes and Willard Tressel

It is certified that error appears in the above-identified patent and that said Letters Patent are hereby corrected as shown below:

| | |
|---|---|
| Column 2 - Line 70 | The word "be" should read --by-- |
| Column 3 - Table 1 Line 31 | Clarify the printing of the word "Vendrassik" if necessary |
| Column 4 - Line 66 | Clarify the printing of the word "analyzer" if necessary |
| Column 5 - Line 32 | Insert a period after the word "measurement" |
| Column 5 - Line 36 | Insert a period after the word "significance" |
| Column 5 - Line 50 | The words "contemporaneously performed" should read --more-- |
| Column 6 - Line 5 | Insert word --of-- after the word "number" |
| Column 6 - Line 13 | The word "element" should read --elements-- |
| Column 6, Line 38 | The word "characteristic" should read --characteristics-- |
| Column 6 - Line 42 | First word "ion" should read --ions-- |
| Column 7 - Line 30 | The word "date" should read --data-- |

Signed and sealed this 22nd day of February 1972.

(SEAL)
Attest:

EDWARD M. FLETCHER, JR.
Attesting Officer

ROBERT GOTTSCHALK
Commissioner of Patents